United States Patent
Pan et al.

(10) Patent No.: US 10,782,140 B2
(45) Date of Patent: Sep. 22, 2020

(54) SYSTEMS AND METHODS FOR DIGITAL ROUTE PLANNING

(71) Applicant: BEIJING DIDI INFINITY TECHNOLOGY AND DEVELOPMENT CO., LTD., Beijing (CN)

(72) Inventors: Rui Pan, Beijing (CN); Zheng Wang, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/266,009

(22) Filed: Feb. 2, 2019

(65) Prior Publication Data

US 2019/0170523 A1 Jun. 6, 2019

Related U.S. Application Data

(63) Continuation of application No. 15/980,711, filed on May 15, 2018, now Pat. No. 10,209,084, which is a continuation of application No. PCT/CN2017/084592, filed on May 16, 2017.

(51) Int. Cl.
*G01C 21/34* (2006.01)
*G06N 20/00* (2019.01)
*G06F 15/76* (2006.01)

(52) U.S. Cl.
CPC ..... *G01C 21/3446* (2013.01); *G01C 21/3453* (2013.01); *G06F 15/76* (2013.01); *G06N 20/00* (2019.01); *G01C 21/3484* (2013.01)

(58) Field of Classification Search
CPC .................................................. G06N 20/00
See application file for complete search history.

(56) References Cited

U.S. PATENT DOCUMENTS

| | | | |
|---|---|---|---|
| 8,478,642 | B2 | 7/2013 | Dey et al. |
| 9,587,952 | B1 | 3/2017 | Slusar |
| 2006/0161337 | A1 | 7/2006 | Ng |
| 2007/0168119 | A1 | 7/2007 | Mori |

(Continued)

FOREIGN PATENT DOCUMENTS

| | | |
|---|---|---|
| CN | 101532846 A | 9/2009 |
| CN | 104990559 A | 10/2015 |

(Continued)

OTHER PUBLICATIONS

Guo Guilin, Dynamic Optimal Path Planning Based on User Selection under Multi-restrictions, Chongqing Jiaotong University dissertation, 2016, 90 pages.

(Continued)

*Primary Examiner* — Thomas G Black
*Assistant Examiner* — Ce Li Li
(74) *Attorney, Agent, or Firm* — Metis IP LLC

(57) ABSTRACT

A method for recommending a route includes obtaining a first start point and a first end point relating to a road network. The method also includes obtaining a route recommendation model. The method further includes determining a recommendation route from the first start point to the first end point based on the route recommendation model.

18 Claims, 10 Drawing Sheets

(56) References Cited

U.S. PATENT DOCUMENTS

| | | | |
|---|---|---|---|
| 2007/0299599 A1* | 12/2007 | Letchner | G01C 21/3484 |
| | | | 701/424 |
| 2008/0027641 A1 | 1/2008 | Fujiwara | |
| 2009/0254266 A1 | 10/2009 | Altrichter et al. | |
| 2010/0106603 A1 | 4/2010 | Dey et al. | |
| 2010/0185384 A1 | 7/2010 | Naito et al. | |
| 2014/0091950 A1 | 4/2014 | Gueziec | |
| 2015/0377640 A1 | 12/2015 | Healey et al. | |
| 2017/0122753 A1 | 5/2017 | Yanagihara et al. | |
| 2017/0322557 A1 | 11/2017 | Fujita | |
| 2018/0106633 A1 | 4/2018 | Chintakindi | |

FOREIGN PATENT DOCUMENTS

| | | |
|---|---|---|
| CN | 106548645 A | 3/2017 |
| TW | I570386 B | 2/2017 |

OTHER PUBLICATIONS

Wang Chen, Research on Dynamic Route Planning Problem Based on Community Detection, Harbin Institutie of Technology Master of Engineering dissertation, 2016, 62 pages.

Brian D. Ziebart et al., Maximum Entropy Inverse Reinforcement Learning, Proceeding of the Twenty-Third AAAI Conference on Artificial Intelligence, 2008, 6 pages, pp. 1433-1438.

International Search Report in PCT/CN2017/064592 dated Feb. 14, 2018, 4 pages.

Written Opinion in PCT/CN2017/084592 dated Feb. 14, 2018, 3 pages.

The Official Letter in Taiwan Application No. 107114381 dated Feb. 25, 2019, 10 Pages.

* cited by examiner

SYSTEMS AND METHODS FOR DIGITAL ROUTE PLANNING

CROSS-REFERENCE TO RELATED APPLICATIONS

This application is a continuation of U.S. patent application Ser. No. 15/980,711, filed on May 15, 2018, which is a continuation of International Application No. PCT/CN2017/084592, filed on May 16, 2017, the contents of which are incorporated herein by reference.

TECHNICAL FIELD

This disclosure generally relates to digital route planning, and more particularly, relates to systems and methods for digital route planning using route recommendation models trained by digital machine learning.

BACKGROUND

Map-based digital navigation has become increasingly popular. Current map-based navigation application generally recommends a route for a user from his or her current location to a destination based on certain predetermined factors and rules (e.g., time to be consumed, route length, traffic condition) specified by the application. However, the user may not choose the recommended route since it may not deemed to be a good route by the user. For example, the user may prefer a route that may be chosen by most people while planning a route from a start point to the destination. Thus route recommendation models recommending better routes may be desired.

SUMMARY

In an aspect of the present disclosure, a method implemented on at least one device each of which has at least one processor and a storage device is provided. The method may include one or more of the following operations. A first start point and a first end point may be obtained by the at least one processor, the first start point and the first end point may relate to a road network. A route recommendation model may be obtained by the at least one processor. A recommended route from the first start point to the first end point may be determined, by the at least one processor, based on the route recommendation model.

In another aspect of the present disclosure, a system for recommending a route is provided. The system may include an acquisition unit and a generation unit. The acquisition unit may be configured to obtain a first start point and a first end point relating to a road network. The generation unit may be configured to obtain a route recommendation model; and determine a recommended route from the first start point to the first end point based on the route recommendation model.

In yet another aspect of the present disclosure, a non-transitory computer readable medium is provided. The non-transitory computer readable medium storing instructions, the instructions, when executed by a computing device, may cause the computing device to perform one or more of the following operations. A first start point and a first end point may be obtained, the first start point and the first end point may relate to a road network. A route recommendation model may be obtained by the at least one processor. A recommended route from the first start point to the first end point may be determined, by the at least one processor, based on the route recommendation model.

In some embodiments, the route recommendation model may be generated based on a method for generating a recommended route, the method may include: obtaining a second start point and a second end point relating to the road network; obtaining a plurality of historical routes from a storage device, each of the plurality of historical routes including the second start point and the second end point; determining a plurality of links between the second start point and the second end point; determining preliminary weights of the plurality of links; determining one or more ordinary routes from the second start point to the second end point based, at least in part, on the preliminary weights of the second plurality of links; adjusting preliminary weights of links on the one or more ordinary routes; adjusting preliminary weights of links on the historical routes; and determining the route recommendation model based on the adjusted weights of the links on the one or more ordinary routes and the adjusted weights of the links on the historical routes.

In some embodiments, determining the preliminary weights of the plurality of links may include obtaining road network data related to the road network, the road network data including one or more road features of the plurality of links between the second start point and the second end point; and determining the preliminary weights of the plurality of links based on the one or more road features of the plurality of links.

In some embodiments, the one or more ordinary routes may be determined according to maximum margin planning (MMP) algorithm or maximum entropy inverse reinforcement learning (IRL) algorithm.

In some embodiments, the one or more ordinary routes may be determined according to the MMP algorithm, the one or more ordinary routes being the shortest route from the second start point to the second end point.

In some embodiments, adjusting the preliminary weights of the links on the one or more ordinary routes and the preliminary weights on the historical routes may include increasing the preliminary weights of the links on the historical routes, and decreasing the preliminary weights of the links on the one or more ordinary routes.

In some embodiments, the weights of the links on historical routes may be increased by first values, the weights of the links on one or more ordinary routes may be decreased by second values, and the first values and the second values may be determined based on one or more hyper-parameters and an optimization algorithm.

In some embodiments, the weights of the links on historical routes may be increased by third values, the weights of the links on one or more ordinary route may be decreased by fourth values, and the third values and the fourth values may be determined based on a softmax algorithm.

In some embodiments, the method may further include obtaining validation data; determining a hit rate of the recommended route based on the validation data, the recommended route being determined based on the route recommendation model; determining whether the hit rate is smaller than a threshold; and in response to the hit rate being smaller than the threshold, adjusting the adjusted weights of the links on the one or more ordinary routes and the adjusted weights of the links on the historical routes.

In some embodiments, the method may further include in response to the hit rate being larger than the threshold, outputting the route recommendation model to a server.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
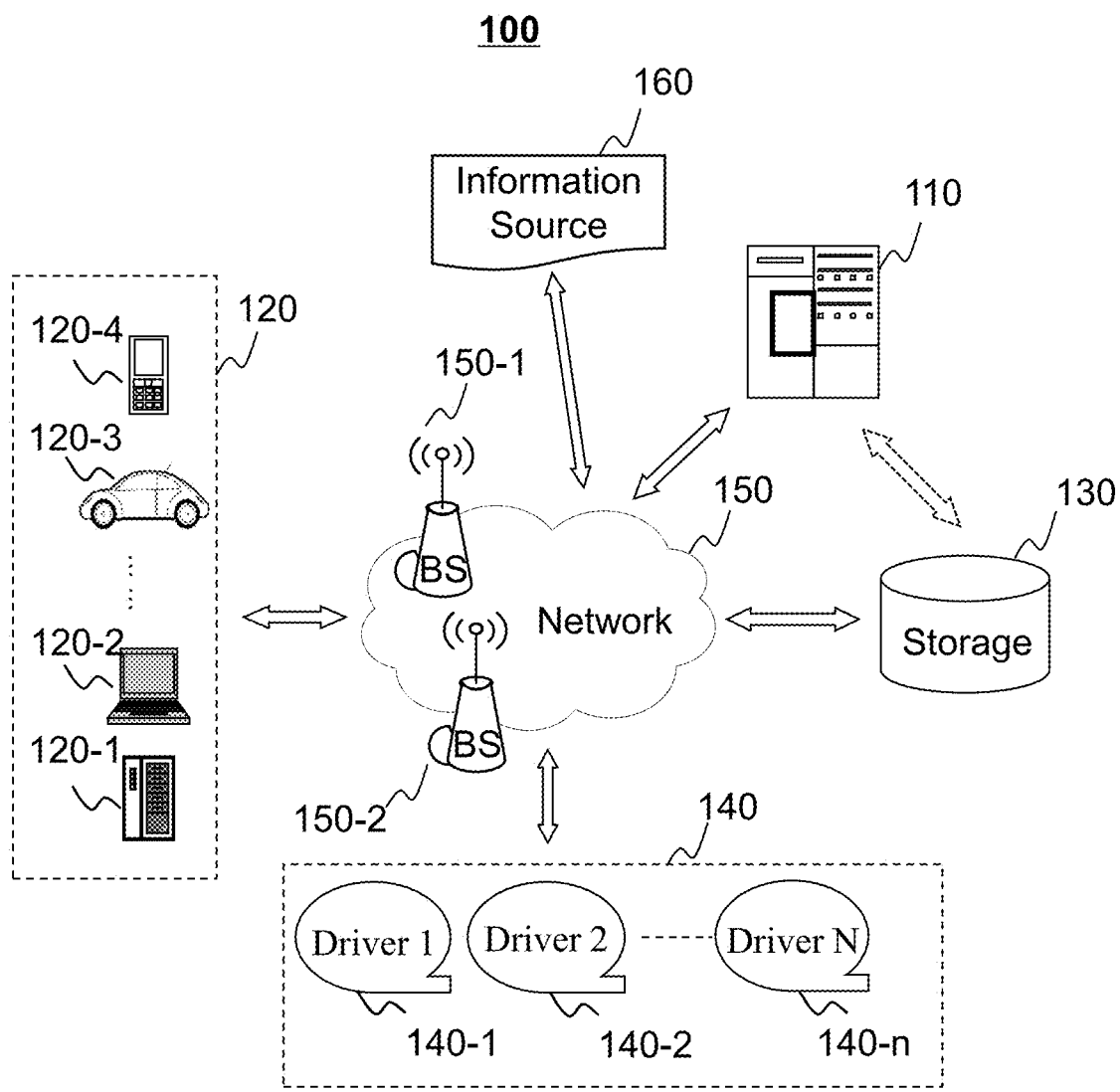
FIG. 1 illustrates a schematic diagram of an exemplary network environment including an exemplary route planning system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Embodiments of the present disclosure may be applied to different transportation systems including but not limited to land transportation, sea transportation, air transportation, space transportation, or the like, or any combination thereof. A vehicle of the transportation systems may include a rickshaw, travel tool, taxi, chauffeured car, hitch, bus, rail transportation (e.g., a train, a bullet train, high-speed rail, and subway), ship, airplane, spaceship, hot-air balloon, driverless vehicle, or the like, or any combination thereof. The transportation system may also include any transportation system that applies management and/or distribution, for example, a system for sending and/or receiving an express. The application scenarios of different embodiments of the present disclosure may include but not limited to one or more webpages, browser plugins and/or extensions, client terminals, custom systems, intracompany analysis systems, artificial intelligence robots, or the like, or any combination thereof. It should be understood that application scenarios of the system and method disclosed herein are only some examples or embodiments. Those having ordinary skills in the art, without further creative efforts, may apply these drawings to other application scenarios. For example, other similar user order receiving system.

The term "user," "passenger," "requester," "service requester," and "customer" in the present disclosure are used interchangeably to refer to an individual, an entity or a tool that may request or order a service. The party may be an individual or device. Also, the term "driver," "provider," "service provider," and "supplier" in the present disclosure are used interchangeably to refer to an individual, an entity, or a device that may provide a service or facilitate the providing of the service. In addition, the term "user" in the present disclosure may refer to an individual, an entity, or a device that may request a service, order a service, provide a service, or facilitate the provision of the service.

The present disclosure is directed to systems and methods for training a route recommendation model. The route recommendation model may be trained by optimizing parameters of the route recommendation model in an iterative training process. During the iterative training process, the weights of roads on historical routes (i.e., actual routes) may be decreased and the weights of roads on ordinary routes (i.e., the routes determined based on weights of roads) may be increased. When the weights of roads on historical routes are small enough, which may indicate a recommended route generated by the route recommendation model is almost an actual chosen by a user, the iterative training process may terminate. The route recommendation model may be used to recommend a route for a user while planning a route.

FIG. 1 is a schematic diagram of an exemplary network environment including an exemplary route planning system according to some embodiments of the present disclosure. Network environment 100 may include a route planning system 110, a terminal 120, a storage 130, a location device 140, a network 150, and an information source 160. Route planning system 110 may be configured to analyze and process collected information to train a route recommendation model. The route recommendation model may be used for predicting a route that a user may choose while planning a route. Route planning system 110 may generate a recommended route for a user (e.g., a driver) based on the trained route recommendation model. Route recommendation system 110 may be implemented on a computing device, such as a computer, a server, or a server group connected via a wired or a wireless network, etc. The server group may be centralized or distributed.

Terminal 120 may communicate with route planning system 110, storage 130, and information source 160. In some embodiments, a user may input data/information via terminal 120 to control the training process of a route recommendation model. For example, a user may input a machine learning model, one or more hyper-parameters related to the model, etc.

Terminal 120 may include a desktop computer 120-1, a laptop computer 120-2, a built-in device of a vehicle 120-3, a mobile device 120-4, or the like, or any combination thereof. Built-in device 120-3 may be a carputer or the like. Mobile device 120-4 may be a smartphone, a personal digital assistance (PDA), a tablet computer, a handheld game player, smart glasses, a smartwatch, a wearable device, a virtual reality device, an augmented reality device (e.g., Google™ Glass, Oculus Rift™, HoloLens, and/or Gear™ VR), or the like, or any combination thereof. In some embodiments, terminal 120 may be used, by a user (e.g., a passenger) to acquire a recommended route from a start point to a destination from route planning system 110.

Storage 130 may store data related to the route recommendation model. In some embodiments, storage 130 may collect data from terminal 120, location device 140, information source 160, and/or route planning system 110. Storage 130 may be a hierarchical database, a network database, a relational database, or the like, or a combination thereof. In some embodiments, storage 130 may be implemented in any device that is capable of storing data, such as a random access memory (RAM), a CD-ROM, a flash memory, a hard disk, a read-only memory (ROM), or the like, or a combination thereof. In some embodiments, storage 130 may directly connect to route planning system 110, or a portion of route planning system 110, via one or more wired and/or wireless communication links. In some embodiments, storage 130 may be implemented in a remote device (e.g., a cloud storage) and connect to route planning system 110 via network 150. Terminal 120 and/or location device 140 may access storage 130 via network 150.

Location device 140 may collect data related to historical routes of users (e.g., drivers). Route planning system 110 may obtain data related to historical routes from location device 140 to train the route recommendation model. In some embodiments, location device 140 may receive a start point and a destination via its input from a user. Location device 140 may also transmit via network 150 the received start point and destination to route planning system 110, which may determine a recommended route using a trained route recommendation model as described elsewhere in this disclosure. Route planning system 110 may further transmit via network 150 the determined recommended route to location device 140, which may output (e.g., via its user interface) the recommended route to the user.

Location device 140 may be any device or system that collects or records historical routes of users involving a positioning technology (e.g., global positioning system (GPS) technology). In some embodiments, location device 140 may be incorporated with terminal 120. For example, mobile device 120-4, which may include a GPS module, may facilitate the communication between route planning system 110 and users as well as the collection of historical routes from users.

Network 150 may be a single network or a combination of networks. For example, the network 150 may include a local area network (LAN), a wide area network (WAN), a public network, a private network, a proprietary network, a public switched telephone network (PSTN), the Internet, a wireless network, a virtual network, or any combination thereof. Network 150 may include multiple network access points, such as a wired or wireless access point, including a base station 150-1, a base station 150-2, a network switch point (not shown), etc. Through the network access points, any data source may be connected to network 150 and transmit information via network 150. Network 150 may also include a wireless network (e.g., Bluetooth® network, wireless local area network (WLAN), and/or Wi-Fi), mobile networks (e.g., 2G, 3G, or 4G signals), or other communication methods (e.g., virtual private network, (VPN), shared network, near field communication (NFC), and/or ZigBee®).

Information source 160 may provide reference information for route planning system 110. The reference information may include various types of information related to the route recommendation model including, for example, traffic information (real-time or historical), weather conditions, municipal service information, information of laws and regulations, and/or news events. The information source 160 may be implemented in a single central server, multiple servers connected via a communication link, or multiple personal devices. When information source 160 is implemented in multiple personal devices, the personal devices can generate content, for example, text, voice, image, and/or video. The reference information may be used, by route planning system 110, during a training process of a route recommendation model.

It should be noted that the above description of network environment 100 containing route planning system 110 is provided for the purposes of illustration, not intended to limit the scope of the present disclosure. For persons having ordinary skills in the art, the components contained in network environment 100 may be combined in various ways, or connected with other components as sub-systems, and various variations and modifications may be conducted under the teaching of the present disclosure. However, those variations and modifications may not depart the spirit and scope of this disclosure. For example, storage 130 may be a cloud computing platform with data storing function that includes but not limited to a public cloud, a private cloud, a community cloud, a hybrid cloud, etc. All such modifications are within the protection scope of the present disclosure.

Figure 2A:
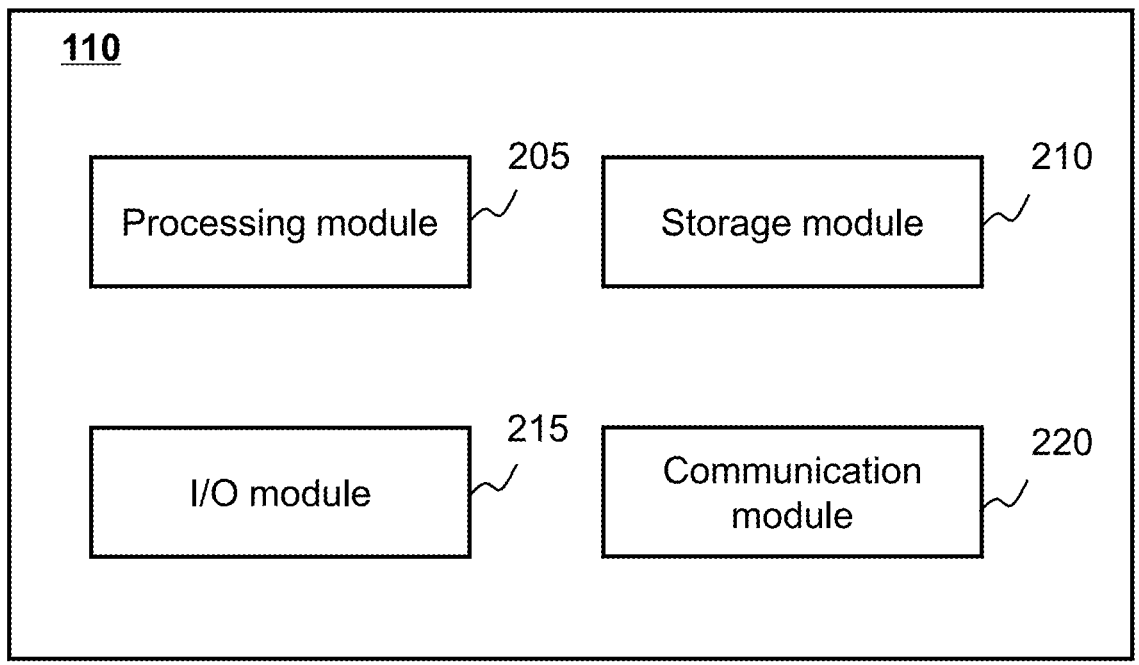
FIG. 2A is a schematic diagram illustrating an exemplary route planning system according to some embodiments of the present disclosure.

FIG. 2A is a schematic diagram illustrating an exemplary route planning system according to some embodiments of the present disclosure. Route planning system 110 may include a processing module 205, a storage module 210, an I/O module 215, and a communication module 220. The modules of route planning system 110 may be centralized or distributed. One or more modules of route planning system 110 may be local or remote.

Processing module 205 may be configured to train the route recommendation model. Processing module 205 may receive information from terminal 120, storage 130, location device 140, and/or information source 160. In some embodiments, processing module 205 may execute computer instructions (e.g., program code) to process the received information in accordance with techniques described herein. For example, processing module 205 may determine one or more ordinary routes based on the maximum margin planning algorithm. And the one or more ordinary routes may be used to adjust a parameter of the route recommendation model. As another example, processing module 205 may optimize the route recommendation model with an optimization algorithm (e.g., gradient descent) to satisfy a condition.

Processing module 205 may include a hardware processor, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Storage module 210 may store data related to the route recommendation model. The data may be obtained from processing module 205, terminal 120, storage 130, location device 140, information source 160, and/or any component of route planning system 110. Storage module 210 may store various data including, for example, programs, codes, algorithms, reference information, historical data, validation data, machine learning model, and/or hyper-parameters of a machine learning model. Storage module 210 may also store computer instructions executed by processing module 205 to perform one or more functions disclosed in the present disclosure.

Storage module 210 may include any device capable of storing data. Merely by ways of example, storage module 210 may include a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM.

I/O module 215 may input and/or output data. In some embodiments, I/O module 215 may enable a user interaction with route planning system 110. For example, a user may set hyper-parameters including, for example, learning rate, and/or mini-batch size, to train a route recommendation model. As another example, I/O 215 may output information (e.g., a recommended route, a request message for determining a preset condition) to a user.

I/O module 215 may also include an input device and an output device. Examples of the input device may include a control panel, a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

Communication module 220 may connect route planning system 110 to a network (e.g., network 150) to facilitate data communication. Communication module 220 may establish connections between route planning system 110 and terminal 120, storage 130, location device 140, and/or information source 160. The connection may be a wired connection, a wireless connection, any other communication connection that can enable information transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, or 5G), or the like, or a combination thereof. In some embodiments, communication module 220 may be and/or include a standardized communication port, such as RS232, RS485, etc. In some embodiments, communication module 220 may be a specially designed communication port.

It should be noted that the above description of route planning system 110 is merely provided for the purposes of illustration, and not intended to limit the scope of the present disclosure. For persons having ordinary skills in the art, multiple variations and modifications may be made under the teachings of the present disclosure. For example, only one processing module is described in route planning system 110. Route planning system 110 may also include multiple processing modules, thus operations and/or method steps that are performed by one processing module as described in the present disclosure may also be jointly or separately performed by the multiple processing modules. However, those variations and modifications do not depart from the scope of the present disclosure.

Figure 2B:
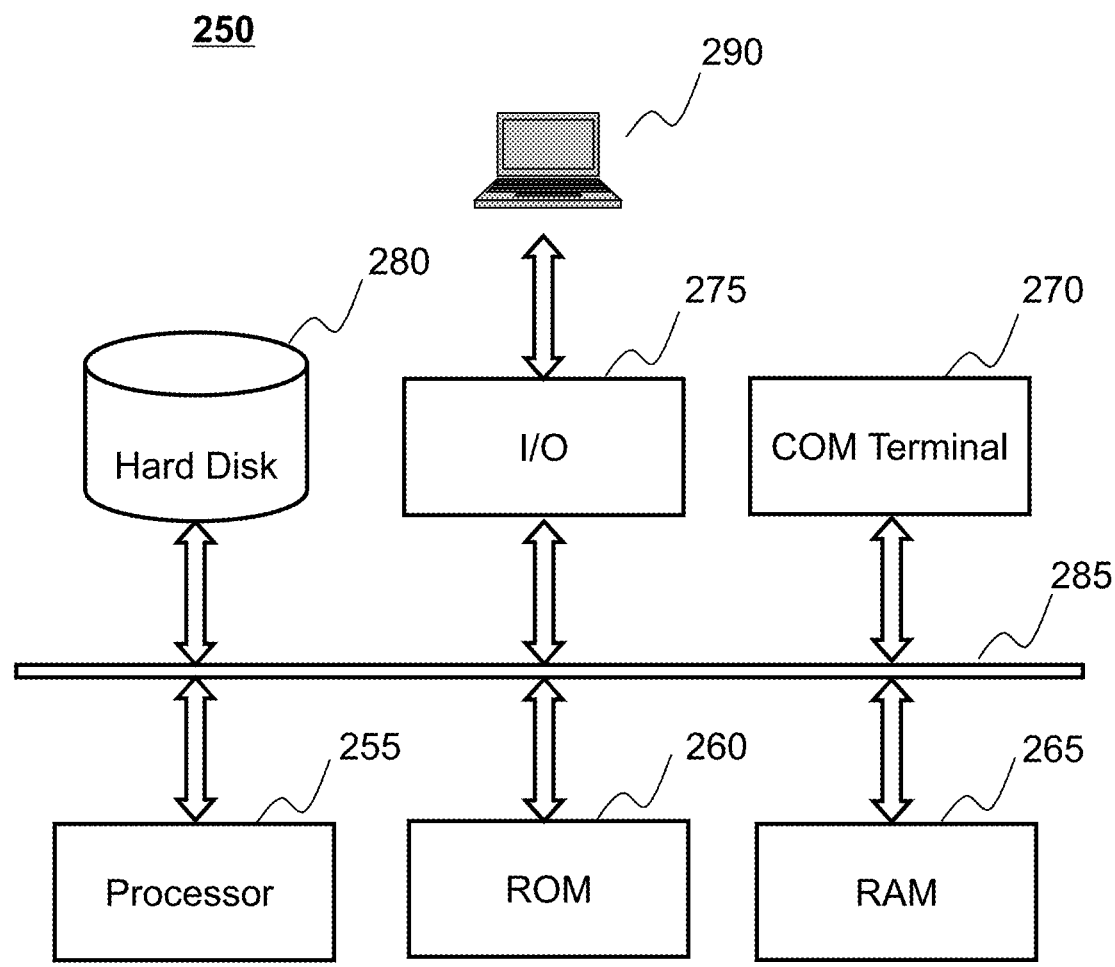
FIG. 2B illustrates a schematic diagram of an exemplary computing device according to some embodiments of the present disclosure.

FIG. 2B illustrates a schematic diagram of an exemplary computing device according to some embodiments of the present disclosure. The particular system may use a functional block diagram to explain the hardware platform containing one or more user interfaces. The computer may be a computer with general or specific functions. Both types of the computers may be configured to implement any particular system according to some embodiments of the present disclosure. Computing device 250 may be configured to implement any components that perform one or more functions disclosed in the present disclosure. For example, route planning system 110 may be implemented in hardware devices, software programs, firmware, or any combination thereof of a computer like computing device 250. For brevity, FIG. 2B depicts only one computing device. In some embodiments, the functions of the computing device, providing function that route planning may require, may be implemented by a group of similar platforms in a distributed mode to disperse the processing load of the system.

Computing device 250 may include a communication terminal 270 that may connect with a network that may implement the data communication. Computing device 250 may also include a processor 255 that is configured to execute instructions and includes one or more processors. The schematic computer platform may include an internal communication bus 285, different types of program storage units and data storage units (e.g., a hard disk 280, a read-only memory (ROM) 260, a random-access memory (RAM) 265), various data files applicable to computer processing and/or communication, and some program instructions executed possibly by processor 255. Computing device 250 may also include an I/O device 275 that may support the input and output of data flows between computing device 250 and other components (e.g. a user interface 295). Moreover, computing device 250 may receive programs and data via the communication network.

Various aspects of methods of providing functions required by route planning and/or methods of implementing other steps by programs are described above. The programs of the technique may be considered as "products" or "artifacts" presented in the form of executable codes and/or relative data. The programs of the technique may be joined or implemented by the computer readable media. Tangible and non-volatile storage media may include any type of memory or storage that is applied in computer, processor, similar devices, or relative modules. For example, the tangible and non-volatile storage media may be various types of semiconductor storages, tape drives, disc drives, or similar devices capable of providing storage function to software at any time.

Some or all of the software may sometimes communicate via a network, e.g. Internet or other communication networks. This kind of communication may load a software from a computer device or a processor to another. For example, a software may be loaded from a management server or a main computer of route planning system 110 to a hardware platform in a computer environment, or to other computer environments capable of implementing the system. Correspondingly, another media used to transmit software elements may be used as physical connections among some of the equipment, for example, light wave, electric wave, or electromagnetic wave may be transmitted by cables, optical cables or air. Physical media used to carry waves, e.g. cable, wireless connection, optical cable, or the like, may also be considered as media of hosting software. Herein, unless the tangible "storage" media is particularly designated, other terminologies representing the "readable media" of a computer or a machine may represent media joined by the processor when executing any instruction.

A computer readable media may include a variety of forms, including but is not limited to tangible storage media, wave-carrying media or physical transmission media. Stable storage media may include compact disc, magnetic disk, or storage systems that are applied in other computers or similar devices and may achieve all the sections of route planning system 110 described in the drawings. Unstable storage media may include dynamic memory, e.g. the main memory of the computer platform. Tangible transmission media may include coaxial cable, copper cable and optical fiber, including circuits forming the bus in the internal of computing device 250. Wave-carrying media may transmit electric signals, electromagnetic signals, acoustic signals or light wave signals. And these signals may be generated by radio frequency communication or infrared data communication. General computer-readable media may include hard disk, floppy disk, magnetic tape, or any other magnetic media; CD-ROM, DVD, DVD-ROM, or any other optical media; punched cards, or any other physical storage media containing aperture mode; RAM, PROM, EPROM, FLASH-EPROM, or any other memory chip or magnetic tape; carrying waves used to transmit data or instructions, cable or connection devices used to transmit carrying waves, or any other program code and/or data accessible to a computer. Most of the computer readable media may be applied in executing instructions or transmitting one or more results by the processor.

It may be understood to those skilled in the art that various alterations and improvements may be achieved according to some embodiments of the present disclosure. For example, the modules of route planning system 110 described above are all achieved by hardware equipment. More particular, processing module 205 may be implemented in processor 255, storage module 210 may be implemented by one or more of ROM 260, RAM 265, and hard disk 280, I/O module 215 may be implemented by I/O 275, and communication module 220 may be implemented by COM terminal 270. All applications, modifications and alterations required to be protected in the claims may be within the scope of the present disclosure.

Figure 3:
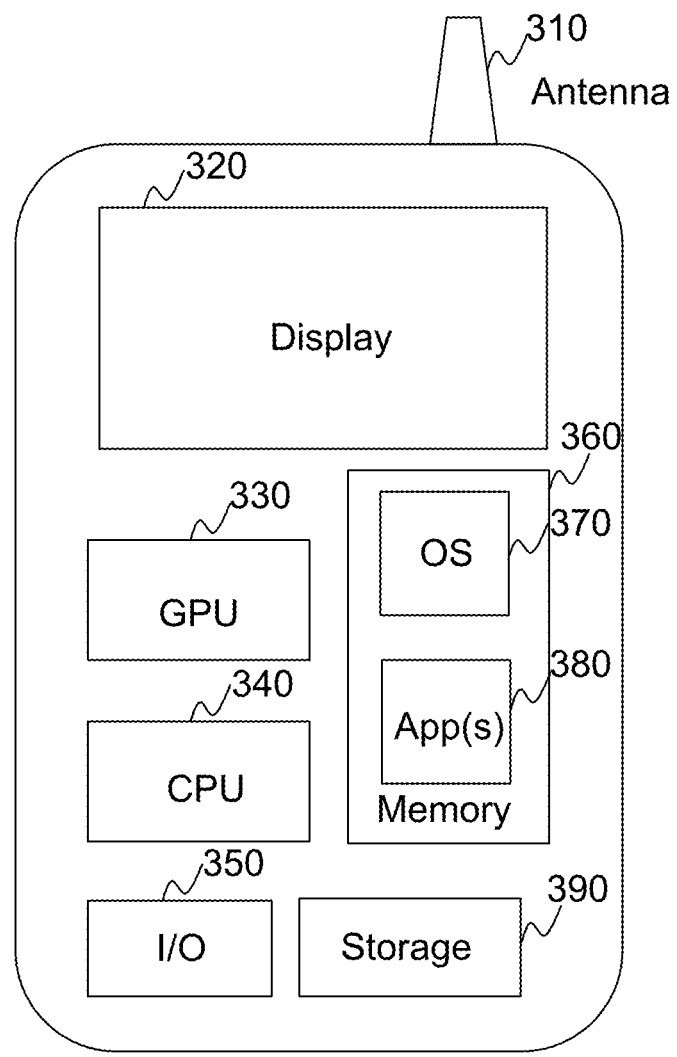
FIG. 3 illustrates a schematic diagram of an exemplary mobile device that is configured to implement a specific system disclosed in the present disclosure.

FIG. 3 illustrates a schematic diagram of an exemplary mobile device that is configured to implement a specific system disclosed in the present disclosure. In some embodiments, terminal 120 may be a mobile device 300 configured to perform one or more functions of terminal 120 disclosed in this disclosure (e.g., displaying and communicating information related to route recommendation model). Mobile device 300 may include but is not limited to a smartphone, a tablet computer, a music player, a portable game console, a GPS receiver, a wearable calculating device (e.g. glasses, or watches), or the like. Mobile device 300 may include one or more central processing units (CPUs) 340, one or more graphical processing units (GPUs) 330, a display 320, a memory 360, an antenna 310 (e.g. a wireless communication unit), a storage unit 390, and one or more input/output (I/O) devices 350. Moreover, mobile device 300 may also be any other suitable component that includes but is not limited to a system bus or a controller (not shown in FIG. 3). As shown in FIG. 3, a mobile operating system 370 (e.g. IOS, Android, or Windows Phone) and one or more applications 380 may be loaded from storage unit 390 to memory 360 and implemented by CPUs 340. Application 380 may include a browser or other mobile applications configured to receive and process information related to route recommendation model in mobile device 300. A user may obtain communication information from route planning system 110 through I/O device 350, and provide the information to route planning system 110 and/or other modules or units of route planning system 110, e.g. storage module 210.

In order to implement various modules, units and their functions described above, a computer hardware platform may be used as hardware platforms of one or more elements (e.g., a module of route planning system 110 described in FIG. 2A). Since these hardware elements, operating systems, and program languages are common, it may be assumed that persons skilled in the art may be familiar with these techniques and they may be able to provide information required in the route planning according to the techniques described in the present disclosure. A computer with user interface may be used as a personal computer (PC), or other types of workstations or terminal devices. After being properly programmed, a computer with user interface may be used as a server. It may be considered that those skilled in the art may also be familiar with such structures, programs, or general operations of this type of computer device. Thus, extra explanations are not described for the figures.

Figure 4A:
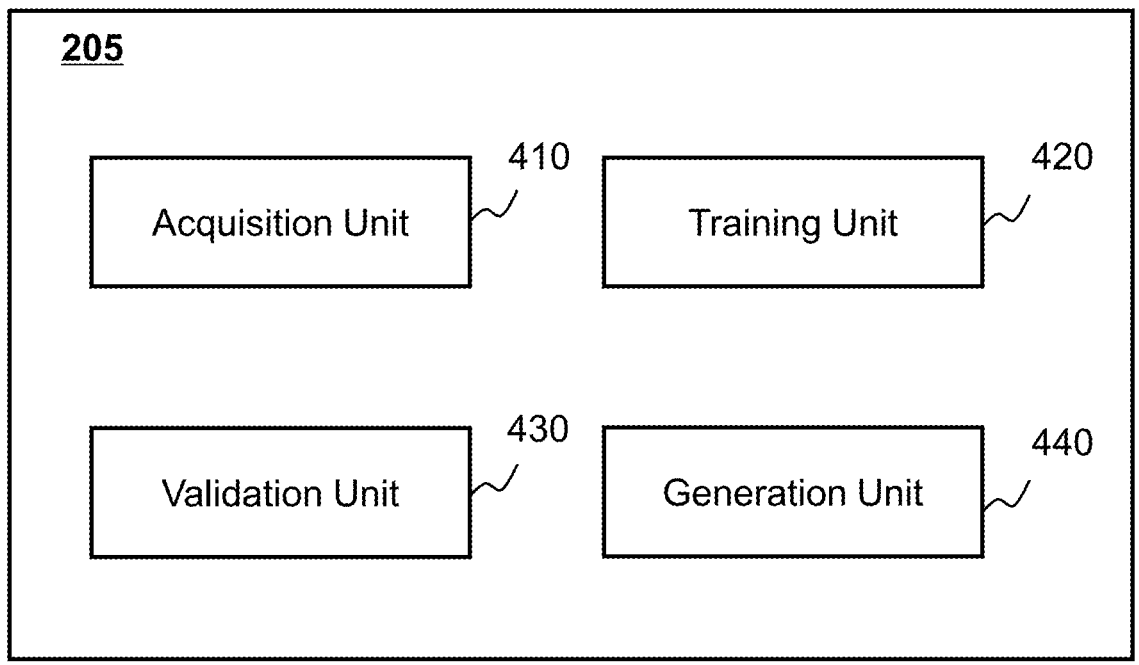
FIG. 4A is a schematic diagram of an exemplary processing module according to some embodiments of the present disclosure.

FIG. 4A is a schematic diagram illustrating an exemplary processing module according to some embodiments of the present disclosure. Processing module 205 may include an acquisition unit 410, a training unit 420, a validation unit 430, and a generation unit 440.

Acquisition unit 410 may acquire data used for training a route recommendation model. In some embodiments, acquisition unit 410 may acquire data from storage module 210, I/O module 215, communication module 220, terminal 120, storage 130, location device 140, information source 160, or any other devices connected to route planning system 110 via network 150 (e.g., a cloud server). The acquired data may include road network data, historical routes, validation data, reference information, algorithms, or the like, or a combination thereof. More particular, road network data may be the data related to an electronic map. In some embodiments, the road network data may include one or more road features such as road length, road width, road safety, traffic light, traffic flow, road maintenance, road type (highway, service road, one-way street, two-way street, etc.), etc. The historical routes may include actual routes of a plurality of users collected by location device 140 over a historical period. The validation data may be used for validating the accuracy of predictions generated based on the route recommendation model. Reference information may include weather condition, news events (e.g., traffic accidents, bridge collapse), etc. The algorithms may include maximum margin planning (MMP), maximum entropy inverse reinforcement learning (maximum entropy IRL), gradient descent, adagrad, loss function, softmax, etc.

In some embodiments, the acquired data, or a portion thereof, may be sent to training unit 420 to train the route recommendation model. In some embodiments, the acquired data, or a portion thereof, may be sent to validation unit 430 to validate the route recommendation model. In some embodiments, acquisition unit 410 may perform a preprocessing operation (e.g., normalizing, and/or wiping off error points) on the acquired data before sending the data to training unit 420 and/or validation unit 430. For example, acquisition unit 410 may normalize the road length, which may range from 0 to 3000, to obtain normalized road length ranging from 0 to 1.

Training unit 420 may train a route recommendation model. The route recommendation model may be used for recommending a route that a user may choose while planning a route. The route recommendation model may be a machine learning model. In some embodiments, the route recommendation model may be a probability model. The route recommendation model may be determined by a user, according to default settings of route planning system 110, or a combination of both.

Training unit 420 may obtain training data from acquisition unit 410 and train the route recommendation model based on the obtained data. In some embodiments, training unit 420 may train the route recommendation model in an iterative process. In such iterative process, one or more parameters of the route recommendation model may be updated, and the route recommendation model may be optimized based on the updated parameters. In some embodiments, the one or more parameters may relate to data obtained from acquisition unit 410. For example, the one or more parameters may relate to road features, such as road length, road width, etc. The training process (e.g., an iterative process) may terminate when a preset condition is satisfied. Training unit 420 may further transmit the trained route recommendation route model to validation unit 430 for validation.

Validation unit 430 may validate the trained route recommendation model. Validation unit 430 may obtain a trained route recommendation model from training unit 420. The obtained route recommendation model may be validated based on the validation data obtained from acquisition unit 410. In some embodiments, validation unit 430 may determine a hit rate, which may represent the accuracy of a recommended route determined according to the trained route recommendation model. The accuracy of the recommended route may be determined by comparing the actual route(s) that the user(s) chose with the route recommended by the route recommendation model. After the route recommendation model is validated (e.g., the hit rate is higher than a threshold), validation unit 430 may transmit the validated route recommendation model to generation unit 440.

Generation unit 440 may generate and output the route recommendation model and/or a recommended route. Generation unit 440 may obtain the route recommendation model from verification unit 430. Generation unit 440 may generate a recommended route based on the route recommendation model. The recommended route may be generated according to, for example, the start point and the destination provided by a user. In some embodiments, generation unit 440 may output the route recommendation model and/or a recommended route to a user (e.g., by connecting to I/O module 215) when planning a route. In some embodiments, generation unit 440 may output the route recommendation model and/or a recommended route to remote devices (e.g., a cloud server) communicating with route planning system 110 (e.g., by connecting to communication module 220).

Figure 4B:
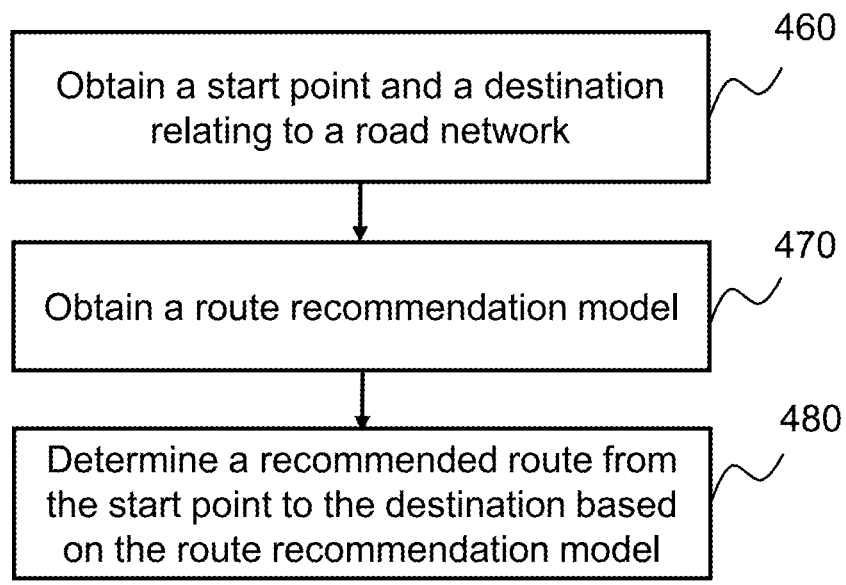
FIG. 4B is a flowchart of an exemplary process for determining a recommended route according to some embodiments of the present disclosure.

FIG. 4B is a flowchart of an exemplary process for determining a recommended route according to some embodiments of the present disclosure. In 460, a start point and a destination may be obtained. The start point and the destination may be obtained by, for example, acquisition unit 410. In some embodiments, location device 140 may receive a start point and a destination via its input from a user. The start point and the destination may be different nodes selected by a user in a road network. As used herein, a node generally refers to an intersection or a connection of roads in a road network.

In 470, a route recommendation model may be obtained. The route recommendation model may be trained by the training unit 420 and/or validated by validation unit 430. The route recommendation model may relate to weights of links. The links may refer to a road segment that connects two different nodes in a road network. The detailed description regarding to the determination of the route recommendation model may be disclosed elsewhere in the present disclosure (e.g., FIG. 5 through FIG. 8). The determined route recommendation model may be obtained by, for example, generation unit 440.

In 480, a recommended route from the start point to the destination may be determined based on the route recommendation model. The recommended route may be determined by, for example, generation unit 440. In some embodiments, the recommended route may be determined by transmitting the start point and the destination to route recommendation model as its input, and a recommended route may be determined according to the recommendation model as its output. In some embodiments, the recommended route may be transmitted to a user (e.g., being displayed on I/O module 215 or being transmitted to the user terminal 120 or 140 via the network 150). In some embodiments, the recommended route may be output to remote devices (e.g., a cloud server) communicating with route planning system 110 (e.g., by connecting to communication module 220).

Figure 5:
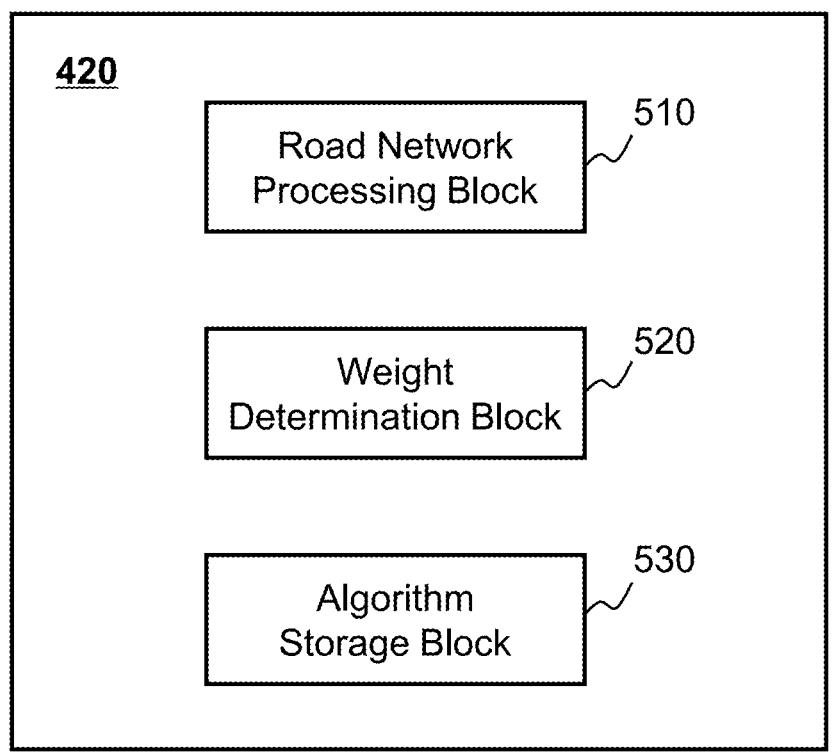
FIG. 5 is a schematic diagram of an exemplary training unit according to some embodiments of the present disclosure.

FIG. 5 is a schematic diagram illustrating an exemplary training unit according to some embodiments of the present disclosure. Training unit 420 may include a road network processing block 510, a weight determination block 520, and an algorithm storage block 530. Road network processing block 510 may process the road network data related to an electronic map. In some embodiments, road network processing block 510 may obtain road network data from acquisition unit 410. Road network processing block 510 may determine elements in the road network using the road network data. Exemplary elements may include nodes, links, etc. As used herein, a node generally refers to an intersection or a connection of roads in a road network, and a link generally refers to a road segment that connects two different nodes in a road network. Road network processing block 510 may determine one or more ordinary routes in the road network. The ordinary routes may refer to the routes that users tend to choose while planning a route.

Road network processing block 510 may acquire weights of links in a road network from weight determination block 520. In some embodiments, road network processing block 510 may determine one or more ordinary routes based on the weights of links in the road network. Road network processing block 510 may acquire one or more algorithms (e.g., MMP, maximum entropy IRL, softmax) from algorithm storage block 530. The one or more ordinary routes may be determined in accordance with the one or more algorithms.

Weight determination block 520 may determine the weight of a link and/or a route. Weight determination block 520 may determine a primary weight of a link and/or a route. Term "primary weight" used herein generally refers to the primary value of the weight of a link and/or a route. Weight determination block 520 may receive road network data from acquisition unit 410. In some embodiments, the road network data may include one or more road features. Exemplary road features of a road may include road length, road width, traffic flow, traffic lights, road safety, road maintenance, road type (highway, service road, one-way street, two-way street, etc.), or the like, or a combination thereof. In some embodiments, weight determination block 520 may receive reference information from acquisition unit 410. The reference information may include weather conditions, information of laws and regulations, news events, etc. In some embodiments, weight determination block 520 may determine a primary weight of a link and/or a route in the road network based on the road features and/or reference information. For example, weight determination block 520 may determine a primary weight of a link by calculating an average value of the values of one or more road features, such as road length, road width, etc. The values of the one or more road features may range from 0 to 1 after a normalizing operation performed by acquisition unit 410. In some embodiments, weight determination block 520 may determine a primary weight of a link and/or a route based on a user input or according to default settings of route planning system 110.

Weight determination block 520 may also determine an adjustment value of the weight of a link and/or a route, and adjust the weight of the link and/or a route based on the adjustment value. In some embodiments, weight determination block 520 may acquire an algorithm (e.g., an optimization algorithm for optimizing the one or more parameters of the route recommendation model such as gradient descent, stochastic gradient descent, or adagrad) from algorithm storage block 530. Weight determination block 520 may determine the adjustment value according to the acquired algorithm. In some embodiments, weight determination block 520 may determine the adjustment value based on a hyper-parameter of the route recommendation model, for example, learning rate, or regularization item. In some embodiments, weight determination block 520 may determine the adjustment value based on a user input, according to default settings of route planning system 110.

Algorithm storage block 530 may store algorithms used in the training process and/or validating process of the route recommendation model, which may be accessed by road network processing block 510 and/or weight determination block 520. The algorithms may relate to road network processing, weight determination, parameter optimization, or the like, or a combination thereof. Exemplary algorithms may include MMP, Maximum Entropy IRL, Softmax, loss function, Maximum Likelihood, etc. In some embodiments, the algorithms stored in algorithm storage block 530 may further include a deep learning algorithm, a decision tree algorithm, a neural network algorithm, or the like, or any combination thereof. More particular, the deep learning algorithm may include a Restricted Boltzmann Machine (RBN), a Deep Belief Networks (DBN), a Convolutional Network, a Stacked Auto-encoders, etc. The decision tree algorithm may include a Classification And Regression Tree (CART), an ID3 (Iterative Dichotomiser 3), a C4.5, a Chi-squared Automatic Interaction Detection (CHAID), a Decision Stump, a Random Forest, a Multivariate Adaptive Regression Spline MARS), or a Gradient Boosting Machine (GBM), etc. The neural network algorithm may include a Perceptron Neural Network, a Back Propagation, a Hopfield Network, a Self-Organizing Map (SOM), or a Learning Vector Quantization (LVQ), etc.

Figure 6:
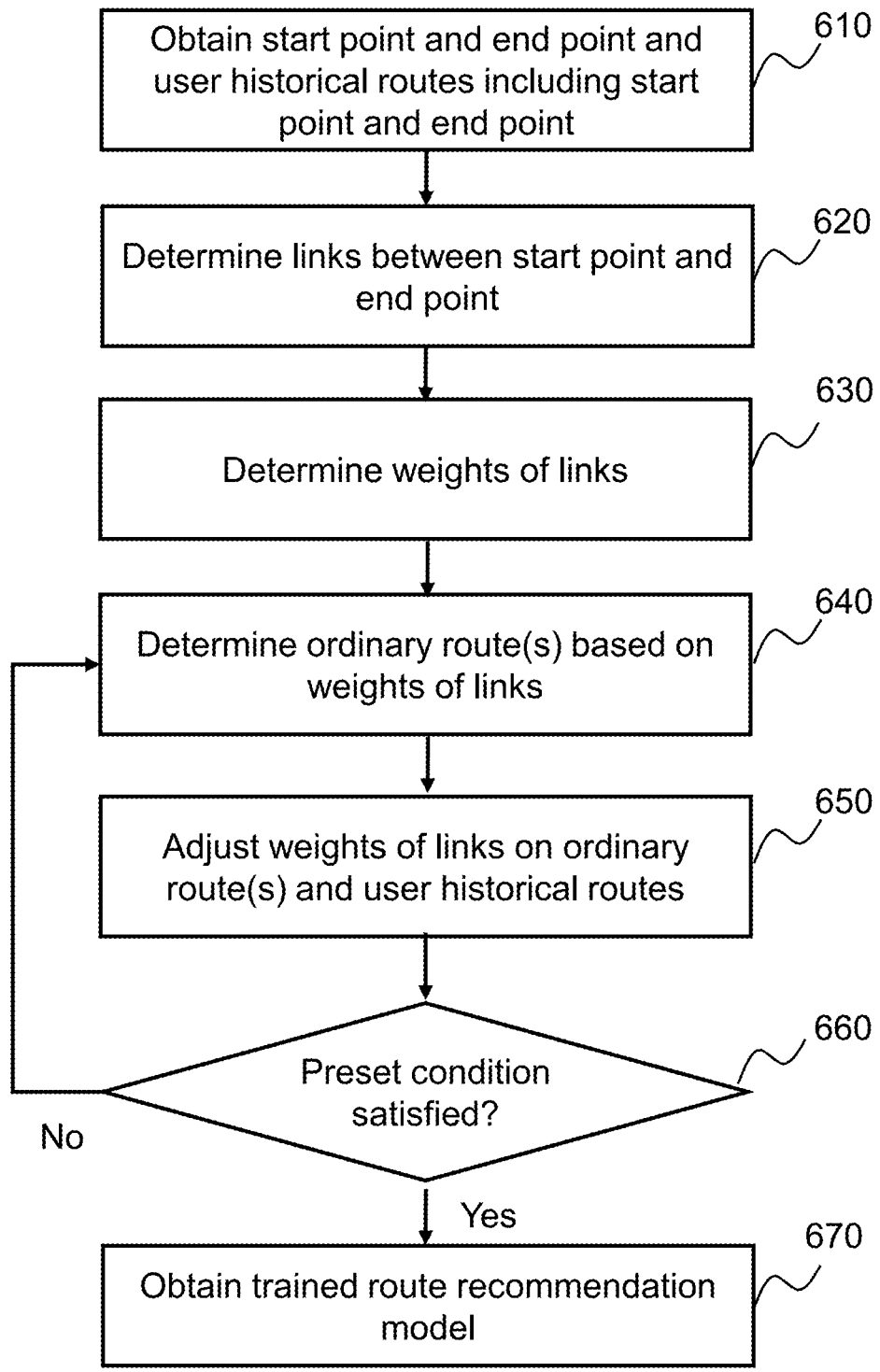
FIG. 6 is a flowchart of an exemplary process for training a route recommendation model according to some embodiments of the present disclosure.

FIG. 6 is a flowchart of an exemplary process for training a route recommendation model according to some embodiments of the present disclosure. In 610, a start point and an end point relating to a road network may be obtained. The start point and the end point may refer to different nodes in a road network. As used herein, a node generally refers to an intersection or a connection of roads in a road network. In some embodiments, the road network may include various types of roads between the start point and the end point. The types of roads may include highway, parkway, beltway, speedway, street, avenue, byway, alley, lane, or the like, or a combination thereof. In some embodiments, the start point and the end point, as well as the user historical routes, may be obtained by I/O module 215. Merely for illustration purposes, one start point and one end point are described. In some embodiments, multiple start points and corresponding end points in a road network may be obtained.

A plurality of historical routes may also be obtained. Each of the plurality of historical routes may include the obtained start point and end point. In some embodiments, some of the user historical routes may start from the start point and end at the end point. Some of the historical routes may have a different start point from the obtained start point and/or a different end point from the obtained start point. For example, a historical route may not start from but may pass through the obtained start point. The user historical routes may be obtained by collecting routes from certain users over a certain period. For example, historical routes including the start point and the end point may be collected from location device 140 (for example, location device 140-1, location device 140-2) over the last month. The historical routes may be obtained from, for example, terminal 120, storage 130, location device 140, or information source 160.

In 620, a plurality of links between the start point and the end point may be determined. The links may be determined by, for example, route processing block 510. A link may refer to a road segment that connects two different nodes in a road network. In some embodiments, a specific area including the start point and the end point may be defined before the links are determined. The specific area may be determined by a user, according to default settings of route planning system 110, or a combination of both. For example, when a road map is displayed on a screen window, the region on the screen may be defined as the specific area. A user may adjust the scale of the road map (e.g., by touching the screen window) to define the specific area within which the links are to be determined. Route processing block 510 may determine, within the specific area, a plurality of links between the start point and the end point. In some embodiments, a route including multiple road segments connecting the start point and the end point, or a part of the route, may also be determined as a link. In some embodiments, a road segment, or a part of the road segment, may be divided into multiple links.

In 630, weights of the links may be determined. Weights of the links may be determined by, for example, weight determination block 520. In some embodiments, the weight of a link determined by weight determination block 520 may also be referred to as a primary weight. A primary weight of a link may be determined based on one or more features of the road corresponding to the link. Exemplary features of a road may include the road width, road length, traffic flow, traffic lights, road safety, intersections, the direction of the road (e.g., from north to south), road type (highway, service road, one-way street, two-way street, etc.), or the like, or a combination thereof. The features mentioned above may be obtained from storage 130, information source 160, or any devices or components described in the present disclosure capable of acquiring or storing features of the road. In some embodiments, a primary weight of a link may be set by a user, according to default settings of route planning system 110, etc.

In 640, one or more ordinary routes may be determined based on the weights of the links. As used herein, an ordinary route may represent one or more routes from the start point to the end point that a user tends to choose. The one or more ordinary routes may be determined according to an algorithm. Merely by ways of example, the algorithm may include maximum margin planning (MMP), maximum entropy inverse reinforcement learning (IRL), softmax, or the like, or a combination thereof.

In some embodiments, the one or more ordinary routes may be determined based on the weights of the links. Merely for illustration purposes, an ordinary route may be determined according to the MMP algorithm. For example, an ordinary route may be the "shortest" route from the start point to the end point, which may be determined based on the weights of the links using the MMP algorithm. The "shortest" route may be defined as the route that has the minimum total weight of the links of the route. The total weight of the links may be the sum of the weight of each link.

As another example, multiple ordinary routes may be determined according to the maximum entropy IRL algorithm. For example, top five routes that have higher total weights of the links of the routes may be determined as the multiple ordinary routes. As another example, the multiple ordinary routes may include routes with less than one hundred links. In some embodiments, each of the multiple ordinary routes may correspond to a specific value. The specific value may represent the probability that the route is chosen by a user while planning a route. In some embodiments, the specific value may be determined based on an algorithm, for example, Softmax algorithm. The Softmax algorithm may be expressed in the following Equation (1):

$$P_A = \frac{e^{-W_A}}{e^{-W_A} + e^{-W_B} + e^{-W_C} + e^{-W_D}}, \quad (1)$$

where A, B, C, and D refer to four ordinary routes according to the maximum entropy IRL algorithm; $W_A$, $W_B$, $W_C$, and $W_D$ refer to the total weights of the links on route A, route B, route C, and route D, respectively; and $P_A$ refers to the probability that route A is chosen by a user while planning a route.

In 650, the weights of the links on ordinary routes and user historical routes may be adjusted. In some embodiments, the weights of the links may be adjusted by, for example, weight determination block 520. Adjustment values of the weights of the links may be determined by a user (e.g., a technician), or set by route planning system 110 according to the progress in the training process of the route recommendation model. In some embodiments, the adjustment value of the weight of a link on an ordinary route may be set according to a hyper-parameter of the route recommendation model. The detailed description regarding the adjustment of the weights of the links on the ordinary routes and user historical routes is disclosed elsewhere in the present disclosure (e.g., FIG. 7 and the description thereof).

The weights of the links in the road network may relate to one or more parameters of the route recommendation model. In some embodiments, the weights of the links in the road network may be a parameter of the route recommendation model. In some embodiments, a specific operation (e.g., mapping) may be performed to associate the weights of the links in the road network with a parameter of the route recommendation model. In some embodiments, the weights of the links in the road network may associate the one or more parameters of the route recommendation model with road network data (e.g., one or more road features such as road length, road width). Operations that adjust the weights of the links in a road network may accommodate the route recommendation model to satisfy a preset condition.

In some embodiments, an optimization algorithm and/or one or more hyper-parameters related to the route recommendation model may be determined before the weights of the links on ordinary routes and user historical routes are adjusted. The optimization algorithm may be used for optimizing one or more parameters of the route recommendation model in the training process. The optimization algorithm may include but not limited to, gradient descent, stochastic gradient descent, adagrad, or the like, or a combination thereof. Exemplary hyper-parameters may include learning rate, variation mode of the learning rate, mini-batch size, or the like, or a combination thereof.

In 660, a determination may be made as to whether a preset condition is satisfied. If the preset condition is satisfied, the process may proceed to 670. If the preset condition is not satisfied, the process may turn into an iteration within which steps 640 through 660 may be repeated to determine a new set of ordinary routes based on the weights of the links in the road network. The weights of the links in the road network may have been changed in the prior iteration, and thus a new set of ordinary routes may be determined in the next iteration accordingly. And the weights of the links on the new set of ordinary routes and the user historical routes may be further adjusted.

In some embodiments, the preset condition may relate to a restriction (e.g., a threshold) for an algorithm that when the algorithm satisfies the restriction, the iteration may terminate. For example, the algorithm may be a loss function. Merely for illustration, the iteration may terminate when the convergence of the loss function is reached in the training process of the route recommendation model and a local optimal solution is obtained. In some embodiments, the preset condition may include a maximum number of iterations (for example, ten times) to be performed, and when the maximum number of iterations are performed (i.e., the preset condition is satisfied), the iteration may terminate (i.e., the process proceeds to 670). The maximum number may be set by a user or according to default settings of route planning system 110, or a combination thereof.

In 670, trained route recommendation model may be obtained. The trained route recommendation model may be determined by training unit 420. Training unit 420 may send the trained route recommendation model to a device or a component of route planning system 110 for predicting or recommending a route for a user or driver. In some embodiments, the route recommendation model may be transmitted to a server (e.g., a cloud server), or one or more terminals (e.g., mobile device 120-4) for route recommendation. In some embodiments, the trained route recommendation model may be saved to a storage device (e.g., storage 130) for storage and/or retrieval by a component of route planning system 110. A recommended route may be generated based on the route recommendation model. In some embodiments, a recommended route may be determined by, for example, generation unit 440 after receiving a start point and a destination of a user. The start point and the destination may be obtained from, for example, I/O module 215.

Figure 7:
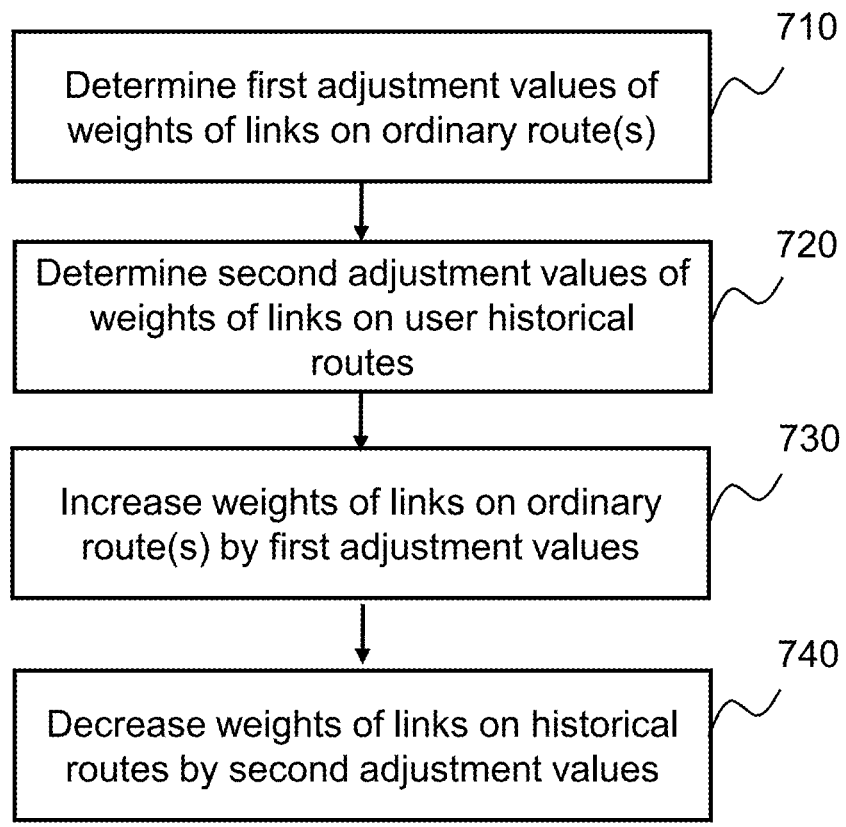
FIG. 7 is a flowchart of an exemplary process for adjusting the weights of the links on ordinary routes and historical routes according to some embodiments of the present disclosure.

In some embodiments, step 650 of process 600 may be performed according to process 700 illustrated in FIG. 7 for adjusting the weights of the links on ordinary routes and historical routes according to some embodiments of the present disclosure. In some embodiments, steps 710 through 740 of process 700 may be performed by, for example, weight determination block 520. In 710, first adjustment values of the weights of links on ordinary route(s) may be determined. According to the MMP algorithm, one ordinary route may be determined. The ordinary route may be the "shortest" route from the start point to the end point. The first adjustment values of the weights of links on the ordinary route may be determined based on a hyper-parameter of the route recommendation model and/or an optimization algorithm. The hyper-parameter of the route recommendation model may include learning rate, variation mode of the learning mode, regularization item, mini-batch size, etc. The optimization algorithm may be used for optimizing one or more parameters of the route recommendation model. The optimization algorithm may include but not limited to, gradient descent, stochastic gradient descent, adagrad, or the like, or a combination thereof. In some embodiments, the first adjustment value of the weight of each link on the ordinary route may be the same. For example, when the gradient descent is used as the optimization algorithm and the learning rate is set to 1, the first adjustment value of the weights of links on the ordinary route may be 1. In some embodiments, the first adjustment value of the weight of a link on the ordinary route may be adaptively adjusted to keep the total weight of the links on the ordinary route a constant.

According to the maximum entropy IRL algorithm, multiple ordinary routes may be determined. The multiple ordinary routes may correspond to multiple probability values. For example, as mentioned above, route A may correspond to a probability value $P_A$. The first adjustment values of the weights of links on the multiple ordinary routes may be determined based on the multiple probability values. For example, an ordinary route A may correspond to a probability value of $P_A$, the first adjustment values of the weights of links on the ordinary route A may be $P_A \cdot K$, where K may be a constant. When the gradient descent is used as the optimization algorithm and the learning rate is set to 1, K may be 1.

In 720, second adjustment values of the weights of links on historical routes may be determined. In some embodiments, the second adjustment values of the weights of links included in historical routes may be determined based on a hyper-parameter of the route recommendation model and/or an optimization algorithm. In some embodiments, a second adjustment value of the weight of a link on a historical route may equal to the first adjustment value of the weight of a link on the ordinary route according to MMP algorithm.

In 730, the weights of links on one or more the ordinary route(s) may be increased by the first adjustment values. A higher weight may indicate a "longer" distance in the road network. After the weights of the links are increased, the one or more ordinary routes may be "longer". A "longer" route may have a lower priority than a "shorter" route when route planning system 110 recommends a route for a user.

In 740, the weights of the links on the user historical routes may be decreased by the second adjustment values. A lower weight may indicate a "shorter" distance in the road network. After the weights of the links are decreased, the user historical routes may be "shorter". A "shorter" route may have a higher priority than a "longer" route when route planning system 110 recommends a route for a user.

Merely for illustration purposes, the weight of a link in a road network may be determined in different ways. For example, the weight of a link may be determined by, for example, weight determination block 520, based on one or more road features and a model M. The model M may be different from the route recommendation model. In some embodiments, the model M may be a differentiable model. The model M may be updated, according to an optimization algorithm in an iteration based on the adjustment value of the weight of the link. And the weight of the link may be updated according to the updated model M. More particular, partial derivatives, for the weight of the link, of all parameters of the model M may be determined. The product of the partial derivatives and the adjustment value of the weight of the link may be used to update the parameters of the model M according to an optimization algorithm. And the weight of the link may be updated according to the updated model M.

For example, when a gradient descent algorithm with a learning rate of 1 is used, the model M may be a linear regression model as expressed in Equation (2):

$$M = a \cdot L + b \cdot W \qquad (2),$$

where L refers to the length of the road corresponding to the link; W refers to the width of the road corresponding to the link; a refers to a parameter of the model M related to road length; and b refers to another parameter of the model M correlate to road width.

In a first embodiment, the parameters a and b may be determined according to MMP algorithm. If the link is on an ordinary route, parameter a and b may be updated in an iteration according to Equations (3)-(4), respectively:

$$a' = a + L \qquad (3),$$

$$b' = b + W \qquad (4),$$

where a' refers to the value of parameter a updated in the iteration; and b' refers to the value of parameter b updated in the iteration. If the link is on a historical route, parameters a and b may be updated in an iteration according to Equations (5)-(6), respectively:

$$a'=a-L \quad (5),$$

$$b'=b-W \quad (6),$$

where a' refers to the value of parameter a updated in the iteration; and b' refers to the value of parameter b updated in the iteration. If the link is neither on an ordinary route nor on a historical route, parameters a and b may remain unchanged.

In a second embodiment, the parameters a and b may be determined according to maximum entropy IRL algorithm. If the link is on an ordinary route, parameters a and b may be updated in an iteration according to Equations (7)-(8), respectively:

$$a'=a+P_A \cdot L \quad (7),$$

$$b'=b+P_A \cdot W \quad (8),$$

where a' refers to the updated value of parameter a in the iteration, b' refers to the updated value of parameter b in the iteration; and $P_A$ refers to the probability that route A is chosen from multiple ordinary routes by a user while planning a route. If the link is on a historical route, parameters a and b may be updated in an iteration according to Equations (5)-(6), respectively. If the link is neither on an ordinary route nor on a historical route, parameters a and b may remain unchanged.

The weight of a link may be determined based on the model M (e.g., the updated parameter a' and b' of the model M), which is expressed in Equation (9):

$$X=a' \cdot L + b' \cdot W \quad (9),$$

Where X refers to the weight of the link updated in the iteration.

Figure 8:
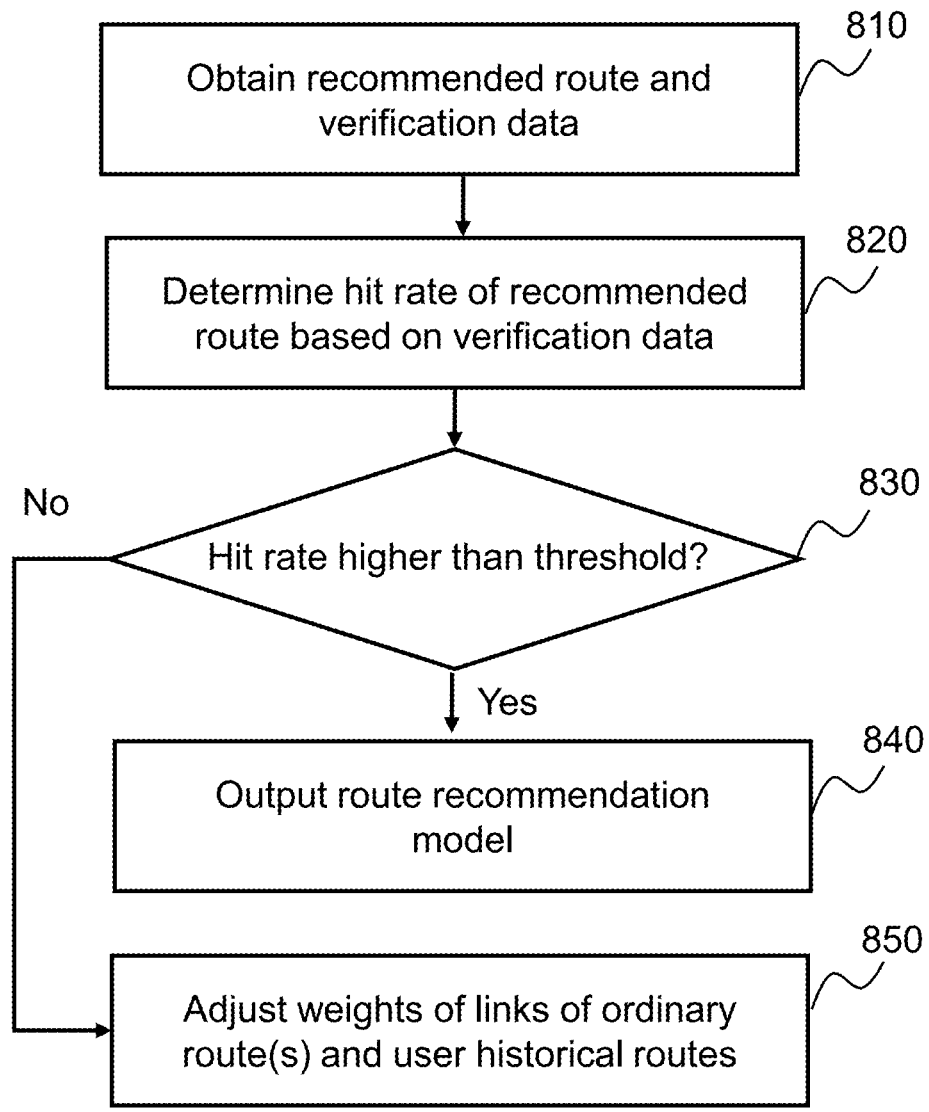
FIG. 8 is a flow chart of an exemplary process for validating a route recommendation model according to some embodiments of the present disclosure.

FIG. 8 is a flowchart of an exemplary process for validating the route recommendation model according to some embodiments of the present disclosure. In 810, a recommended route and verification data may be obtained. In some embodiments, validation unit 430 may obtain a recommended route and verification data. The recommended route may be generated by generation unit 440 based on the route recommendation model obtained in process 600. Generation unit 440 may generate a recommended route based on a start point and a destination. In some embodiments, the start point may be the current location of a user. In some embodiments, the start point and the destination may be obtained from a user (e.g., location device 140 or terminal 120), or set by route planning system 110, etc. In some embodiments, multiple start points and corresponding destinations from different users and/or at different times (e.g., eight A.M. on Monday, twelve P.M. on Monday, eight P.M. on Sunday) may be obtained to validate the route recommendation mode.

Validation data may include validation routes that contain the obtained start point and destination. As used herein, the validation routes may be defined relative to the historical routes. The validation routes may have at least one route different from the historical routes. The validation routes may include one or more routes formed at a time after the period within which the historical routes are formed. For example, the actual routes obtained in January (e.g., by location device 140) from certain users may be defined as the historical routes, and the actual routes obtained in February (e.g., by location device 140) from certain users may be defined as the validation routes. Alternatively or additionally, the validation routes may include one or more routes obtained at a time after the period within which the historical routes are obtained. For example, one or more validation routes may be obtained over a period after the training process of the route recommendation model terminates. In some embodiments, some of the validation routes may start from the start point and end at the destination. Some of the validation routes may have a different start point from the obtained start point and/or a different destination from the obtained destination. For example, a recent route may not start from but may pass through the obtained start point.

In 820, a hit rate of the recommended route may be determined based on the validation data. The hit rate may represent the accuracy of a recommended route determined according to the trained route recommendation model. In some embodiments, the hit rate may be a determined by validation unit 430. When the route recommendation model is used to recommend a route for a user, the accuracy of the recommended route may be determined by comparing the actual route that a user chose with the recommended route. The actual route that a user chose may be a validation route.

In 830, a determination may be made as to whether the hit rate is higher than a threshold. In some embodiments, the determination may be made by validation unit 430. If validation unit 430 determines that the hit rate is higher than the threshold, the process may proceed to 840, and generation unit 440 may output the route recommendation model. If validation unit 430 determines that the hit rate is not higher than the threshold, the process may proceed to 850 to further adjust the weights of the links in the road network. The threshold may be set by a user or according to default settings of route planning system 110. In some embodiments, the threshold may be set by a user via I/O module 215.

In 840, the route recommendation model may be output. The route recommendation model may be transmitted (e.g., by generation unit 440) to a device or a component of route planning system 110 for predicting or recommending a route for a user. In some embodiments, the route recommendation model may be transmitted to a server (e.g., a remote server) or one or more terminals (e.g., terminal 120) for route recommendation. In some embodiments, the route recommendation model may be saved to a storage device (e.g., storage 130) for storage and/or retrieval by a component of route planning system 110.

In 850, the weights of the links of one or more ordinary routes and historical routes may be adjusted. In some embodiments, the weights of the links may be adjusted by weight determination block 520. In some embodiments, in response to the hit rate being not higher than the threshold, the process may proceed to process 600 for training the route recommendation model in a new round. In the new round, one or more ordinary routes may be determined, the weights of the links on the ordinary routes and the historical routes may be adjusted, and a determination may be made as to whether a preset condition being satisfied as described elsewhere in this disclosure (e.g., FIG. 6). In some embodiments, the algorithm for adjusting the weights of the links on ordinary routes and historical routes may be changed comparing with the prior round. For example, the MMP algorithm may be replaced by the maximum entropy IRL, if the hit rate remains lower than the threshold after certain rounds of training of the route recommendation model. In some embodiments, the algorithm for optimizing the parameters of the route recommendation model may be replaced by another algorithm comparing with the prior round. In some embodiments, primary weights of the links may be re-determined. For example, the primary weight of a link may be re-determined based at least partially on some other information, such as weather, road maintenance, etc. In some embodiments, a new set of historical routes may be provided for training the route recommendation model.

In some embodiments, process 800 may be combined with process 600 for training a route recommendation model and validating the trained model. Step 850 may be substituted by steps 640 through 660.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A method implemented on at least one device each of which has at least one processor and a storage device, the method comprising:
  obtaining, by the at least one processor, a first start point and a first end point relating to a road network, wherein the road network includes multiple links, and the first start point and the first end point are acquired from a location device; obtaining, by the at least one processor, a route recommendation model, wherein a parameter of the route recommendation model includes weights of the multiple links of the road network, the weights are determined based at least partially on a model different from the route recommendation model, and the model for determining the weights is updated based on adjustment values of the weights, wherein the route recommendation model is generated based on a method for generating a recommended route, the method comprising:
obtaining a second start point and a second end point relating to the road network;
obtaining a plurality of historical routes from a storage device, each of the plurality of historical routes including the second start point and the second end point;
determining a plurality of links between the second start point and the second end point;
determining primary weights of the plurality of links;
determining one or more ordinary routes from the second start point to the second end point based, at least in part, on the primary weights of the plurality of links;
adjusting primary weights of links on the one or more ordinary routes;
adjusting primary weights of links on the historical routes; and
determining the route recommendation model based on the adjusted weights of the links on the one or more ordinary routes and the adjusted weights of the links on the historical routes; and
determining, by the at least one processor, a recommended route from the first start point to the first end point based on the route recommendation model; and
causing a user terminal to display the recommended route on an user interface.

2. The method of claim 1, wherein determining the primary weights of the plurality of links includes:
obtaining road network data related to the road network, the road network data including one or more road features of the plurality of links between the second start point and the second end point; and
determining the primary weights of the plurality of links based on the one or more road features of the plurality of links.

3. The method of claim 1, wherein the one or more ordinary routes are determined according to maximum margin planning (MMP) algorithm or maximum entropy inverse reinforcement learning (IRL) algorithm.

4. The method of claim 1, wherein the one or more ordinary routes are determined according to the MMP algorithm, the one or more ordinary routes being the shortest route from the second start point to the second end point.

5. The method of claim 1, wherein adjusting the primary weights of the links on the one or more ordinary routes and the primary weights on the historical routes includes:
increasing the primary weights of the links on the historical routes; and
decreasing the primary weights of the links on the one or more ordinary routes.

6. The method of claim 1, further including:
obtaining a loss function associated with the route recommendation model;
determining whether a convergence of the loss function is reached;
in response to the determination that the convergence of the loss function is reached,
outputting the route recommendation model to the terminal device; and
in response to the determination that the convergence of the loss function is not reached,
initating a next iteration to update the route recommendation model, wherein the next iteration includes:
determining another one or more ordinary routes from the second start point to the second end point based, at least in part, on the primary weights of the plurality of links;
adjusting primary weights of links on the another one or ore ordinary routes;
adjusting the primary weights of links on the historical routes; and
determining the route recommendation model based on the adjusted primary weights of the links on the another one or more ordinary routes and the adjusted primary weights of the links on the historical routes.

7. The method of claim 1, further including:
obtaining a preset number of iterations;
determining whether the preset number of iterations are performed;
in response to the determination that the preset number of iterations are performed,
outputting the route recommendation model to the terminal device; and
in response to the determination that the preset number of iterations are not performed,
initating a next iteration to update the route recommendation model, wherein the next iteration includes;
determining new one or more ordinary routes from the second start point to the second end point based, at least in part, on the primary weights of the plurality of links;
adjusting primary weights of links on the new one or more ordinary routes;
adjusting the primary weights of links on the historical routes; and
determining the route recommendation model based on the adjusted primary weights of the links on the new one or more ordinary routes and the adjusted primary weights of the links on the historical routes.

8. The method of claim 1, wherein the weights of the multiple links of the road network relate to a parameter of the route recommendation model.

9. The method of claim 1, wherein the weights of the multiple links of the road network may be determined based on at least one of a road width, a road length, a traffic flow, traffic lights, road safety, intersections, the direction of the road, or a road type.

10. A system, comprising:
at least one storage medium including a set of instructions; and
at least one processor configured to communicate with the at least one storage medium, wherein when executing the set of instructions, the at least one processor is directed to:
obtain a first start point and a first end point relating to a road network, wherein the road network includes multiple links, and the first start point and the first end point are acquired from a location device;
obtain a route recommendation model, wherein a parameter of the route recommendation model includes weights of the multiple links of the road network, the weights are determined based at least partially on a model different from the route recommendation model, and the model for determining the weights is updated based on adjustment values of the weights, wherein to obtain the route recommendation model, the at least one processor is directed to:

obtain a second start point and a second end point relating to the road network:
obtain a plurality of historical routes from a storage device, each of the plurality of historical routes including the second start point and the second end point;
determine a plurality of inks between the second start point and the second end point;
determine primary weights of the plurality of links;
determine one or more ordinary routes from the second start point to the second end point based, at least in part, on the primary weights of the plurality of links:
adjust primary weights of links on the one or more ordinary routes;
adjust primary weights of links on the historical routes; and
determine the route recommendation model based on the adjusted weights of the links on the one or more ordinary routes and the adjusted weights of the links on the historical routes; and
determine a recommended route from the first start point to the first end point based on the route recommendation model; and
cause a user terminal to display the recommended route on a user interface.

11. The system of claim 10, wherein to determine the primary weights of the plurality of links, the at least one processor is directed to:
obtain road network data related to the road network, the road network data including one or more road features of the plurality of links between the second start point and the second end point; and
determine the primary weights of the plurality of links based on the one or more road features of the plurality of links.

12. The system of claim 10, wherein the one or more ordinary routes are determined according to the MMP algorithm, the one or more ordinary routes being the shortest route from the second start point to the second end point.

13. The system of claim 10, wherein to adjust the primary weights of the links on the one or more ordinary routes and the primary weights on the historical routes, the at least one processor is directed to:
increase the primary weights of the links on the historical routes; and
decrease the primary weights of the links on the one or more ordinary routes.

14. The system of claim 10, the at least one processor is further directed to:
obtain a loss function associated with the route recommendation model;
determine whether a convergence of the loss function is reached;
in response to the determination that the convergence of the loss function is reached,
output the route recommendation model to the terminal device; and
in response to the determination that the convergence of the loss function is not reached,
initate a next iteration to update the route recommendation model, wherein the next iteration includes:
determine another one or more ordinary routes from the second start point to the second end point based, at least in part, on the primary weights of the plurality of links;
adjust primary weights of links on the another one or more ordinary routes;
adjust the primary weights of links on the historical routes; and
determine the route recommendation model based on the adjusted primary weights of the links on the another one or more ordinary routes and the adjusted primary weights of the links on the historical routes.

15. The system of claim 10, the at least one processor is further directed to:
obtain a preset number of iterations;
determine whether the preset number of iterations are performed;
in response to the determination that the preset number of iterations are performed,
output the route recommendation model to the terminal device; and
in response to the determination that the preset number of iterations are not performed,
initate a next iteration to update the route recommendation model, wherein the next iteration includes:
determine new one or more ordinary routes from the second start point to the second end point based, at least in part, on the primary weights of the plurality of links;
adjust primary weights of links on the new one or more ordinary routes;
adjust the primary weights of links on the historical routes; and
determine the route recommendation model based on the adjusted primary weights of the links on the new one or more ordinary routes and the adjusted primary weights of the links on the historical routes.

16. The method of claim 10, wherein the weights of the multiple links of the road network relate to a parameter of the route recommendation model.

17. The system of claim 10, wherein the weights of the multiple links of the road network may be determined based on at least one of a road width, a road length, a traffic flow, traffic lights, road safety, intersections, the direction of the road, or a road type.

18. A non-transitory computer readable medium storing instructions, the instructions, when executed by a computing device, causing the computing device to:
obtain a first start point and a first end point relating to a road network, wherein the road network includes multiple links, and the first start point and the first end point are acquired from a location device;
obtain a route recommendation model, wherein a parameter of the route recommendation model includes weights of the multiple links of the road network, and the weights are determined based at least partially on a model different from the route recommendation model, and the model for determining the weights is updated based on adjustment values of the weights wherein to obtain the route recommendation model, the at least one processor is directed to:
obtain a second start point and a second end point relating to the road network;
obtain a plurality of historical routes from a storage device, each of the plurality of historical routes including the second start point and the second end point;
determine a plurality of links between the second start point and the second end point;

determine primary weights of the plurality of links;
determine one or more ordinary routes from the second start point to the second end point based, at least in part, on the primary weights of the plurality of links;
adjust primary weights of links on the one or more ordinary routes;
adjust primary weights of links on the historical routes; and
determine the route recommendation model based on the adjusted weights of the links on the one or more ordinary routes and the adjusted weights of the links on the historical routes; and
determine a recommended route from the first start point to the first end point based on the route recommendation model; and
cause a user terminal to display the recommended route on a user interface.

* * * * *